May 30, 1967      W. G. RUNYAN      3,323,036
ALTERNATOR REGULATOR
Filed May 1, 1963
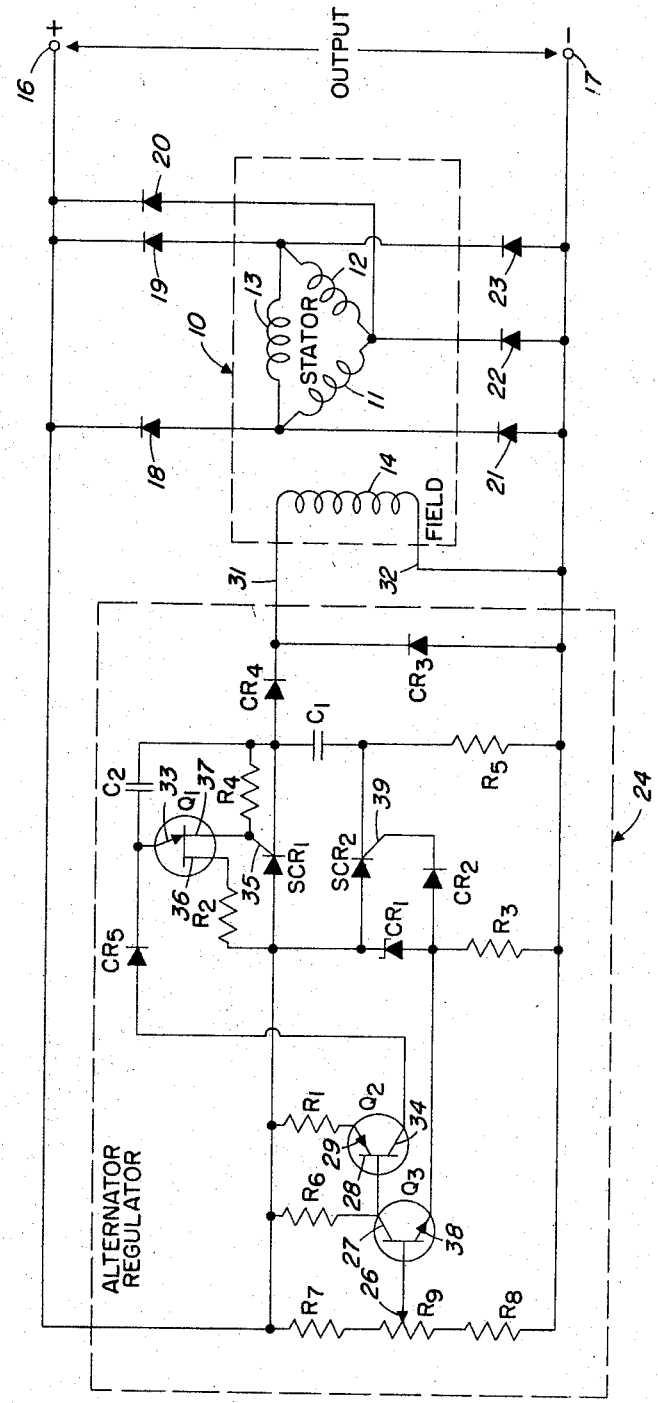
INVENTOR.
WESLEY G. RUNYAN
BY
ATTORNEY

United States Patent Office 3,323,036
Patented May 30, 1967

3,323,036
ALTERNATOR REGULATOR
Wesley G. Runyan, Marion, Iowa, assignor to Collins Radio Company, Cedar Rapids, Iowa, a corporation of Iowa
Filed May 1, 1963, Ser. No. 277,289
1 Claim. (Cl. 322—28)

This invention relates in general to alternators, and in particular to a novel regulator for an alternator.

It is oftentimes desirable to produce an output from an alternator that is held constant. For example, in automobiles or other vehicles the engine speed varies from slow to quite high. However, it is desirable to maintain the output voltage of the alternator at a constant voltage because the circuitry of the vehicle operates on a fixed voltage direct current level. This may be accomplished by varying the field excitation of the alternator. The present invention varies the field current of the alternator by varying the pulse density current applied to the field. Each pulse applies a fixed amount of energy to the alternator field, and the alternator excitation is proportional to the number of pulses per second, or pulse density. The advantage of the present pulse density scheme is that it results in a very good performance with a comparatively simple circuit.

The present invention operates entirely from the direct current output of the alternator rectifiers and does not require a connection to the AC alternator windings as in most other circuits. This allows the present invention to be directly substituted for carbon pile regulators presently in use. It is also to be noted that the present invention required no transformers, chokes, or magnetic amplifiers, which results in a simple economical design.

An object of the invention is to provide an efficient regulator which does not overheat.

Further features, objects and advantages of this invention will become apparent from the following description and claims when read in view of the drawings in which:

The figure is a schematic of the alternator regulator.

In the figure an alternator is designated generally as 10 and has a three-phase stator with windings 11, 12, and 13. A field winding 14 also forms a part of the alternator. Output terminals 16 and 17 are connected to the stator windings 11, 12 and 13 through diodes 18, 19, 20, 21, 22, and 23. The alternator 10 and diodes 18 through 23 are conventional forms of an alternator in which three-phase AC current is rectified by the diode to DC.

Output terminals 16 and 17 might, for example, be connected to a battery and other utilization means wherein direct current is required. The output terminals 16 and 17 are also connected to series resistors $R_7$, $R_9$, and $R_8$ which form part of the alternator regulator designated generally as 24.

A transistor $Q_3$ has its base connected to a slide contact 26 which is engageable with resistor $R_9$. A collector 27 of the transistor $Q_3$ is connected to the base 28 of transistor $Q_2$. A resistor $R_6$ is connected between the collector 27 and output terminal 16. A resistor $R_1$ is connected between output terminal 16 and the emitter 29 of transistor $Q_2$. A first silicon controlled rectifier $SCR_1$ has one side connected to output terminal 16, and its other side connected to a diode $CR_4$. The other side of diode $CR_4$ is connected to terminal 31 of field winding 14.

The other terminal 32 of field winding 14 is connected to output terminal 17. A unijunction transistor $Q_1$ has its emitter 33 connected to the collector 34 of transistor $Q_2$ through a diode $CR_5$. The second electrode 36 of unijunction transistor $Q_1$ is connected to output terminal 16 through resistor $R_2$. The other electrode 37 of unijunction transistor $Q_1$ is connected to the control electrode 35 of the silicon control rectifier $SCR_1$ and through resistor $R_4$ to diode $CR_4$.

Condenser $C_1$ is connected in series with resistor $R_5$ between output terminal 17 and diode $CR_4$. A diode $CR_3$ is connected between output terminal 17 and terminal 31 of the field winding 14. A resistor $R_3$ is connected between terminal 17 and the emitter 38 of transistor $Q_3$. A second silicon control rectifier $SCR_2$ is connected between output terminal 16 and condenser $C_1$. Its control element 39 is connected to a diode $CR_2$ which has its other side connected to the resistor $R_3$.

In an actual embodiment, the components had the following values:

| | |
|---|---|
| $SCR_1$ | Type TCR 520. |
| $SCR_2$ | Type STCR 153. |
| $Q_1$ | Type 2N1671. |
| $Q_2$ | Type 2N525. |
| $Q_3$ | Type 2N388. |
| $CR_1$ | Type 1M16Z5. |
| $CR_2$ | Type 1N540. |
| $CR_3$ | Type 1N1582. |
| $CR_4$ | Type 1N248. |
| $CR_5$ | Type 1N1487. |
| $R_1$ | 330 ohms. |
| $R_2$ | 220 ohms. |
| $R_3$ | 1500 ohms. |
| $R_4$ | 100 ohms. |
| $R_5$ | 200 ohms, 10 watts. |
| $R_6$ | 3300 ohms. |
| $R_7$ | 2000 ohms. |
| $R_8$ | 2000 ohms. |
| $R_9$ | 1000 ohms. |
| $C_1$ | 10 mfd. |
| $C_2$ | 0.1 mfd. |

In operation, the alternator regulator 24 generates pulses of energy to be applied to the field 14 at a rate sufficient to maintain the output voltage at a desired level. If the voltage goes above the desired level, the frequency of pulses to the field 14 will decrease, thus reducing the output voltage, and if the voltage at output terminals 16 and 17 falls below the desired level, the number of pulses to the field 14 will increase, thus increasing the generated voltage until it is at the desired level.

This is accomplished in the following manner:

Referring to the drawing, $SCR_1$ is driven by unijunction transistor $Q_1$ which, in turn, is controlled by transistors $Q_2$ and $Q_3$. $SCR_2$ controls the commutating energy which turns $SCR_1$ off at the end of each cycle. The circuit can be described as a silicon controlled rectifier chopper in which $SCR_1$ is the main chopping element.

Zener diode $CR_1$ and bias resistor $R_3$ provide reference voltage for two portions of the circuit. Zener diode $CR_1$ is selected to break down at a potential less than the minimum output voltage from the alternator and thus provides a constant fixed reference potential in the system. First, the emitter of error sensing transistor $Q_3$ is connected to the reference voltage. $Q_3$ is thus driven in accordance with the difference between the reference voltage at its emitter and the sample voltage at its base. Second, the reference voltage is connected through $CR_2$ to the gate of $SCR_2$. This causes $SCR_2$ to be triggered on whenever its forward anode-to-cathode voltage exceeds the reference voltage.

Commutating capacitor $C_1$ and charging resistor $R_5$ provide energy for reverse-biasing the SCR's when it is required that they be turned off.

Diode $CR_4$ provides isolation to prevent nuisance commutation of the SCR's by voltages developed in the inductive field. Free-wheeling diode $CR_3$ allows the field inductance to maintain field current at times when $SCR_1$ is off.

Transistor $Q_2$ provides charging current through $CR_5$ to capacitor $C_2$ when $SCR_1$ is off. $CR_5$ prevents the flow of reverse $Q_2$ collector current when $SCR_1$ is on. Unijunction transistor $Q_1$ allows $C_2$ to discharge into the $SCR_1$ gate circuit whenever the voltage across $C_2$ exceeds the unijunction firing voltage. $R_2$ provides second base voltage for the unijunction, and $R_4$ provides a leakage current path for $SCR_1$.

A cycle of operation is described as follows:

When input voltage is first applied to the circuit, $SCR_1$ is in its off state so that no voltage appears across the field. If the input voltage is lower than normal, $Q_3$ conducts heavily and drives $Q_2$. $Q_2$ collector current charges $C_2$ until the voltage across $C_2$ reaches the unijunction firing voltage. The unijunction fires and discharges $C_2$ into the $SCR_1$ gate. This triggers $SCR_1$ to its on state and applies voltage to the field through $CR_4$. Voltage is also applied to the series elements $C_1$ and $R_5$. $SCR_1$ remains on until $C_1$ charges through $R_5$ to a voltage slightly exceeding the reference voltage of $CR_1$. At this time the cathode of $SCR_2$ becomes more negative than its gate so that $SCR_2$ is turned on by current through $CR_2$. The $C_1$ voltage is thus applied to $SCR_1$ with the polarity required to turn $SCR_1$ off. $SCR_1$ returns to its off state and the cycle is completed. $SCR_2$ remains on until commutated off by $C_1$ the next time $SCR_1$ is triggered.

It should be pointed out that $SCR_1$ remains on only until $C_1$ becomes charged to the reference voltage. Thus, a fixed burst of energy is applied to the field whenever $SCR_1$ is triggered. By triggering more often, more bursts of energy per second, or more power, is applied to the field. Adjustment of the triggering rate in accordance with the error in alternator output voltage results in the proper correction of alternator field current.

The operation of the pulse generator means of this invention is seen to define a pulse repetition rate which is a function of the charging rate of capacitor $C_2$. The charging rate of capacitor $C_2$ is in turn proportional to the difference between the sample voltage applied to transistor $Q_3$ and the reference voltage established by $CR_1$. The pulse repetition rate is defined by the RC time constant of capacitor $C_1$ and resistor $R_5$. The pulse duration is thus defined by the conduction time of $SCR_1$. $SCR_2$ fires to quench $SCR_1$ when capacitor $C_1$ charges to a potential equaling the reference potential established by $CR_1$. Capacitor $C_1$ is thus charging during the time that $SCR_1$ is firing to apply the line voltage 16 across the RC network. Capacitor $C_1$ charges to the reference potential established by $CR_1$ to fire $SCR_2$, and then $C_1$ rapidly discharges through the field winding to essentially ground reference. Actually the decaying field maintains field current flow and capacitor $C_1$ charges in a negative direction to approximately 1-volt below ground level corresponding to the threshold bias of free-wheeling diode $CR_3$. Capacitor $C_2$ thus charges through $R_1$, $Q_2$, $CR_5$ and $CR_4$ and the field or alternator at a time when the potential on capacitor $C_1$ is essentially being clamped to zero. This charging current for capacitor $C_2$ is minimal as concerns the field current since $C_2$ is a much smaller capacitor than $C_1$ and its charging current is in the milliamperes range while that of capacitor $C_1$ is in the ampere range. For practical purposes then, the charging of $C_2$ has a minimal or negligible effect on the charge of capacitor $C_1$ and the current through the field winding 14.

It is seen that this invention provides a novel alternator regulator circuit which operates on pulse density. It is to be realized that the circuit may be used to contol a direct current generator if desired.

Although it has been changed with respect to preferred embodiments thereof, it is not to be so limited, as changes and modifications may be made therein which are within the full intended scope of the invention as defined by the appended claim.

I claim:

A regulator for an alternator having a stator and field windings with a rectifier connected to the stator windings and output terminals connected across the rectifier, the alternator-regulator connected with its output to the field winding of the alternator, a pulse generator circuit with a detector portion connected to the output terminals to detect the output voltage level and producing pulses of equal lengh but varying in frequency such that the alternator produces a constant output voltage independent of speed of rotation of the alternator drive means, said pulse forming circuit comprising a first silicon controlled rectifier with one side connected to one of the output terminals, an RC time constant circuit comprising a resistor and condenser connected between a second terminal of the silicon controlled rectifier and the other output terminal, the field winding of the alternator connected across the RC time constant circuit, a second silicon controlled rectifier connected with one terminal to the first output terminal and a second terminal of the second rectifier connected to the junction point between the resistor and capacitor, and means controlling the first and second silicon controlled rectifiers to produce pulses of equal lengths but which vary inversely in frequency with variations of the output voltage of the alternator.

References Cited

UNITED STATES PATENTS

| | | |
|---|---|---|
| 3,008,082 | 11/1961 | Schlicher. |
| 3,209,234 | 9/1965 | Bridgeman _____ 322—28 |
| 3,209,236 | 9/1965 | Bridgeman _____ 322—28 |

MILTON O. HIRSHFIELD, *Primary Examiner.*

J. J. SWARTZ, *Assistant Examiner.*